Figures 1, 2:
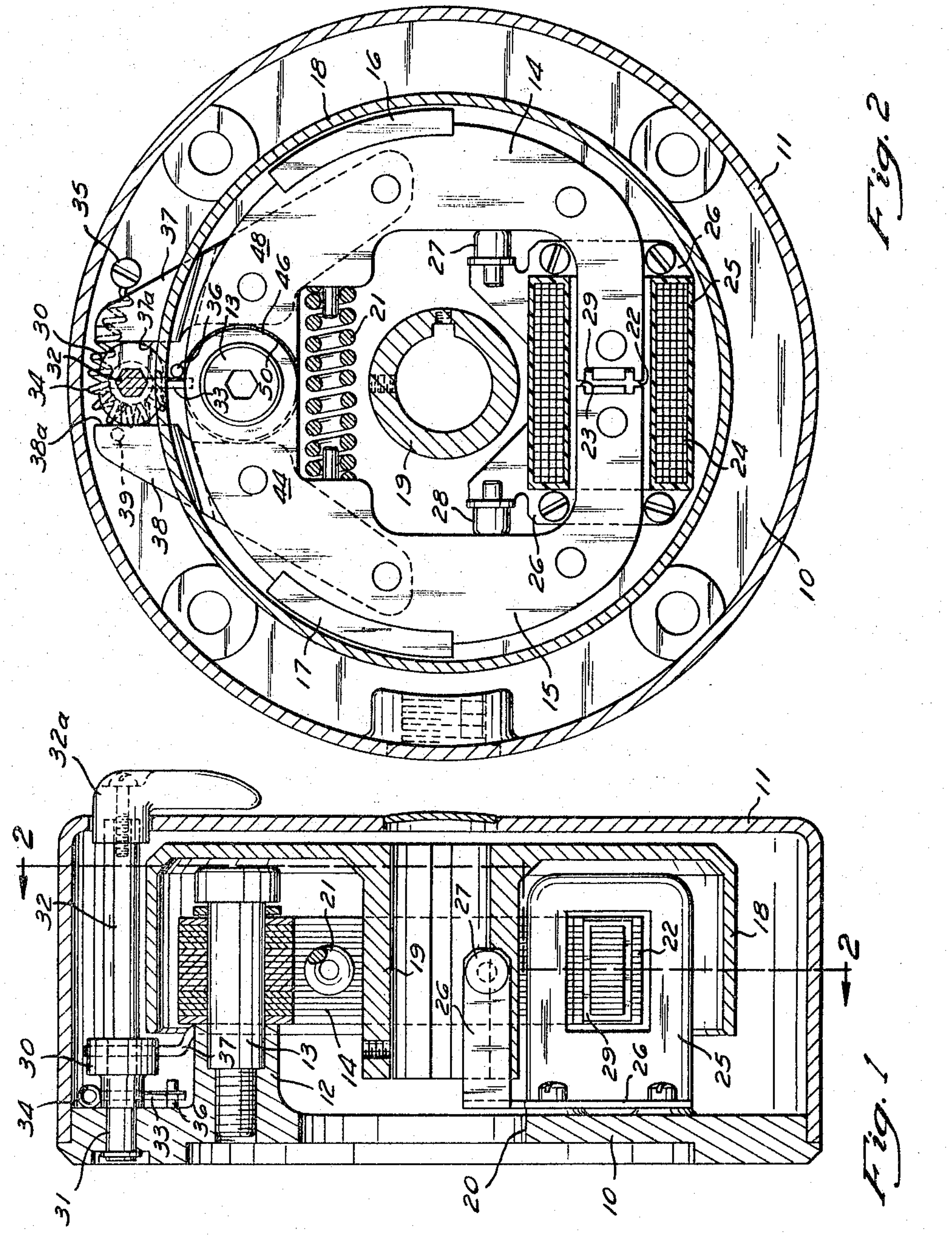

May 2, 1967 J. A. MASON 3,317,011

LOW PRESSURE, TORQUE-SUSTAINING FRICTIONAL COUPLING

Filed July 7, 1965

INVENTOR.
JAMES A. MASON

BY

Ely, Golrick + Flynn
ATTORNEYS

United States Patent Office 3,317,011

Patented May 2, 1967

3,317,011

LOW PRESSURE, TORQUE-SUSTAINING FRICTIONAL COUPLING

James A. Mason, Shaker Heights, Ohio, assignor to Fawick Corporation, a corporation of Michigan Filed July 7, 1965, Ser. No. 469,999
6 Claims. (Cl. 188—171)

This invention relates to a low pressure, torque-sustaining frictional coupling suitable for use as a clutch or brake, particularly an electromagnetic clutch or brake.

Prior to the present invention the conventional practice in the manufacture of brakes and clutches has been to use friction wear pads or linings of hard and dense friction material in combination with a brake or clutch drum or disc of cast iron or steel. These wear pads or linings are moved into frictional, torque-sustaining engagement with the drum or disc when the brake or clutch is applied. Because of the low heat conductivity of cast iron or steel, relatively high surface temperatures are produced by the frictional, torque-sustaining engagement of the wear pads or linings against the drum or disc. This has necessitated the use of asbestos as the principal material in the friction shoes because of its ability to withstand such high temperatures. Practical experience indicated that the friction shoes should be as hard and dense as possible for maximum life. Consequently various resin-bonded asbestos friction materials, usually containing metal particles to scrape off any asbestos or resins which attempt to adhere to the drum or disc, have been used almost universally in brakes and clutches.

Aluminum, despite the advantages inherent in its recognized high heat conductivity, was considered impractical for brake or clutch drums or discs because of its comparative softness and low-wear resistance. This led to the experimental development of hypereutectic aluminum-silicon alloys of greater hardness and wear-resistance. However, practical experience with such alloys shows that the silicon crystals at the frictional engagement surface of the drum or disc, which greatly enhance its hardness and wear-resistance, are easily torn loose by wear pads or linings of conventional hard and dense friction materials and this is accompanied by rapid abrasion of the aluminum.

The present invention is based upon the unexpected discovery that, in a brake or clutch where the maximum pressure between a wear pad and the drum or disc is relatively low (i.e., below 50 pounds per square inch), a low wear rate is achieved with a drum or disc composed primarily of aluminum with silicon particles embedded therein in combination with frictional wear pads of a material which has elastomeric properties under the braking or clutching load. Preferably, the drum or disc is of hypereutectic aluminum-silicon alloy. Surprisingly, the extremely hard silicon crystals in the alloy drum or disc do not produce excessive wear or damage on the much softer frictional wear pads. The high aluminum content of the alloy drum or disc provides excellent heat conductivity which reduces the temperatures at the frictionally-engaging surfaces of the wear pads and the drum or disc. This reduction of the surface temperatures makes it practicable to use wear pads of materials having elastomeric properties under load which previously were considered unsuitable because of their inability to withstand such high temperatures. The use of such wear pad materials completely avoids the tearing loose of the silicon crystals embedded in the aluminum of the alloy drum or disc which previously made it impractical to use hypereutectic aluminum-silicon alloys in such drums or discs. In addition, the use of friction wear pads of such material enables the brake or clutch to maintain its rated torque, even after several hundred thousand cycles of operation, and avoids any excessive scoring or other damage to the alloy drum or disc.

This novel combination of elastomeric wear pads and a hypereutectic aluminum-silicon alloy drum or disc is particularly advantageous in electromagnetic brakes or clutches. In such devices, the lower weight of the aluminum alloy drum or disc minimizes its mechanical inertia. Furthermore, the use of a non-magnetic aluminum alloy as the material of the drum or disc and the use of wear pads which are free of magnetic particles completely avoids the problems formerly encountered because of the build-up in the air gap of magnetic particles which were abraded from the drum or disc or from the year pads as a result of repeated applications of the brake or clutch.

A principal object of this invention is to provide a novel and improved low pressure, torque-sustaining frictional coupling, such as a brake or clutch.

Another object of this invention is to provide such a coupling which combines a frictional engagement member, such as a drum or disc, composed primarily of aluminum with silicon particles embedded therein and a frictional wear pad or lining having elastomeric properties under load.

Another object of this invention is to provide a novel and improved electromagnetic torque-sustaining coupling, such as a brake or clutch.

Further objects and advantages of this invention will be apparent from the following detailed description of presently-preferred embodiments thereof, with reference to the accompanying drawing which shows, for illustrative purposes, one type of electromagnetic brake embodying the present invention.

In the drawing:

FIGURE 1 is an axial sectional view of an electromagnetic brake embodying the present invention; and FIGURE 2 is a cross-section of this brake, taken along the line 2—2 in FIG. 1.

Referring first to FIG. 1, the brake shown therein comprises a housing including a rigid back plate 10 and a generally cup-shaped cover 11 attached thereto. The back plate has an internal, longitudinally inwardly extending, annular boss 12 which supports a pivot pin 13. The pivot pin extends horizontally forward within the brake housing. A pair of oppositely facing, laminated, ferromagnetic brake shoes 14 and 15 of generally C-shaped configuration are both pivoted at their upper ends on this pivot pin 13. These shoes carry respective outwardly-facing brake linings or wear pads 16 and 17 for engagement with the inside of a brake drum 18. The brake drum has a central axial hub 19 which is adapted to be mounted on a shaft (not shown) extending rotatably through a central opening 20 in the backplate 10 of the brake housing. This shaft may be the shaft of an electric motor, for example.

This brake is normally spring-applied by means of a relatively stiff main spring 21 (FIG. 2), which is engaged under compression between the brake shoes 14 and 15 at a location below the common pivot 13 for both brake shoes. This main spring urges both brake shoes laterally outward for braking engagement of their respective wear pads 16 and 17 with the brake drum 18. The maximum pressure between each wear pad and the brake drum is substantially below 50 pounds per square inch.

At their lower ends in FIG. 2 the respective brake shoes 14 and 15 present confronting pole tips 22 and 23, which are spaced apart from each other when the brake is engaged. An electromagnetic coil 24 surrounds, and is inductively coupled to, the lower ends of the brake shoes. This coil is enclosed in a dielectric housing 25 carried by a bracket 26, which is bolted to the inside face of the back wall 10 of the brake housing. This bracket also carries laterally disposed, compressible, resilient centering bumpers 27 and 28 of rubber or the like which the insides of the respective brake shoes 14 and 15 engage when the brake is released. These bumpers center the magnetically joined pair of shoes in the center of the drum bore when the coil is energized. The bumpers also position the bracket 26 when the coil 24 is being mounted so the bracket is properly centered with respect to the brake shoes which are positioned (centered) by the major axis of the release cam when it is in the "release" position prior to the assembly of the drum.

The brake shoe 14 carries a short-circuit shading coil 29 at its pole tip 22.

The brake shoes 14 and 15 together provide a ferromagnetic circuit for magnetic flux having an air gap between the pole tips 22 and 23. When the coil 24 is energized, these pole tips are drawn together to close this air gap. The laterally inward movement of the brake shoes retracts both wear pads 16 and 17 from the brake drum 18, as well as compressing the main spring 21 further. Also, the centering bumpers 27 and 28 are slightly compressed by this inward movement of the brake shoes.

When the coil 24 is de-energized, the brake-applying main spring 21 forces the brake shoes 14 and 15 apart to a position in which their respective wear pads 16 and 17 are in frictional, torque-sustaining engagement with the brake drum, so that the brake is fully engaged.

This brake has a manual release arrangement which includes a release cam 30 mounted on a longitudinally disposed shaft 31, which is rotatably mounted in the back wall 10 of the housing. An operating handle **32*a* for the cam is disposed in front of the cover 11. This handle has a rearwardly projecting extension 32 extending longitudinally of the assembly outside the brake drum 18 and having its back end rigidly attached to the release cam 30. This extension 32 is spaced vertically above the pivot pin 13 for the brake shoes 14 and 15. The cam 30** is of oblong, rounded configuration presenting a major diameter portion and a minor diameter portion disposed perpendicular to one another.

The cam carries a cross pin 33. A coil spring 34 is connected at one end to this cross pin and at its opposite end to a mounting screw 35 on the back plate 10 of the brake housing. This spring is under tension and it urges the unitary assembly of cam 30 and operating handle 32, **32*a* clockwise in FIG. 2. A stop pin 36 projects forward from the back plate 10 of the brake housing in the path of the cross pin 33 when the cam is turned counterclockwise, against the urging of spring 34**. As shown in FIG. 1, this stop pin limits the extent to which the cam can be turned counterclockwise. In this extreme counterclockwise position of the cam, its major diameter portion is disposed horizontal and its minor diameter portion is vertical, as shown in FIG. 1.

A pair of rigid arms 37 and 38 are rigidly attached to the brake shoes 14 and 15, respectively, and extend upward therefrom on opposite sides of cam 30, as shown in FIG. 2. These arms constitute cam followers for engagement by the cam, when the latter is rotated, in order to release the brake manually. These cam follower arms 37 and 38 present inside flat faces **37*a* and 38*a* which are disposed substantially vertical and are engageable with the opposite sides of the cam. The cam follower arm 38 carries a stop pin 39 which is engageable by the cross pin 33 on the cam to limit the clockwise rotation of the cam under the urging of the return spring 34. In its extreme clockwise position, the minor diameter portion of the cam is disposed horizontal between the cam follower faces 37*a* and 38*a*** and its major diameter portion is vertical.

When the coil 24 is de-energized and the cam 30 is in its normal, extreme clockwise position, the brake-applying main spring 21 spreads the brake shoes 14 and 15 apart for frictional torque-sustatining engagement of the wear pads 16 and 17 with the inside of brake drum 18.

In order to release the brake manually, the operator grasps the handle **32*a* and turns it counterclockwise. After the cam 30 has turned a sufficient extent, its major diameter portion will begin to engage the cam follower arms 37 and 38 and will spread them apart progressively. This causes the brake shoes 14 and 15 (to which the arms 37 and 38 are connected rigidly) to be retracted inwardly against the force of the main spring 21, thereby disengaging the wear pads 16 and 17** from the brake drum and releasing the brake.

The operating handle 32, **32*a* and cam 30 are turned counterclockwise a full 90°, to the position shown in FIG. 2, where the major diameter portion of the cam is disposed horizontal between the cam follower faces 37*a* and 38*a*. At this point the stop pin 36 is engaged by the cross pin 33 carried by the cam. In this position, while the brake is released, there is still a slight air gap between the pole tips 22 and 23 of the brake shoes 14 and 15**.

If the coil 24 is energized now it will draw the pole tips of the brake shoes together, closing this air gap and also moving the cam follower arms 37 and 38 apart from the cam 30 a sufficient distance to permit the cam to be returned by its spring 34 clockwise 90° from its position in FIG. 2, where its major diameter portion is horizontal, to its other extreme position where its major diameter portion is vertical. In this manner, the manual release arrangement is automatically reset to its position in which it does not prevent the main spring 21 from applying the brake. The stop pin 39 on cam follower arm 38 is engaged by the cross pin 33 on cam 30 to define this limit position of the cam.

In accordance with the presently-preferred embodiment of the present invention, the brake drum 18 is made of a hypereutectic aluminum-silicon alloy having a high silicon content. In one preferred embodiment the composition of this alloy is 1.9% silicon, 0.6% copper, 1.0% magnesium, 0.4% manganese and the balance aluminum, as described in the article by E. E. Stonebrook, entitled, "Aluminum Alloy With High Silicone Content," which appeared in Transactions, American Foundrymen's Society, vol. 68, 1960. This alloy contains silicon crystals embedded throughout in the aluminum. At the inside, frictional engagement face of the brake drum made of this alloy the silicon crystals present extremely hard, glassy, exposed surfaces for engagement by the frictional wear pads 16, 17. As long as these hard-surfaced silicon crystals stay firmly embedded in the aluminum they limit the wear rate of this brake drum surface. Because the silicon crystals, except at their exposed surfaces on the inside of the drum, are in intimate contact with, and virtually surrounded by, the aluminum, the frictionally generated heat at the inside, frictional engagement face of the drum is rapidly conducted away from this face due to the high heat conductivity of the aluminum.

However, in actual practice prior to the present invention a commercially practicable brake capable of operating at relatively low maximum braking pressures (i.e., up to about 50 p.s.i.) could not be achieved with a hypereutectic aluminum-silicon alloy brake drum because of the relative ease with which the silicon crystals could be torn loose. The accepted practice of matching a hard brake drum surface with wear pads of a material as hard and dense as practicable led to totally unsuccessful results because the silicon crystals were torn loose by such wear pads and this, of course, was accompanied by extremely rapid wear of the brake drum whose braking surface now was effectively just soft aluminum.

I have discovered that this previously insuperable problem can be overcome by employing a wear pad material whose behavior is essentially elastomeric under the torque-sustaining, braking load. Contrary to accepted practice, this wear pad material is much softer than the brake drum surface which it is to engage. Its softness is such that it does not tear loose the silicon crystals embedded in the aluminum of the brake drum alloy. At the same time, its elastomeric properties enable it to have a high coefficient of friction with the essentially glassy exposed surfaces presented by these silicon crystals at the inside, frictional engagement face of the drum, so that a very effective frictional, torque-sustaining coaction between the wear pads and the brake drum is achieved. There is no substantial tendency for such wear pads to become glazed, even after several hundred thousand cycles of operation, so that the rated torque of the brake or clutch is still achieved after long continued use. Also, the wear pads do not produce excessive scoring or other damage to the frictional engagement surface of the drum or disc.

In one practical embodiment, the wear pad material is composed of asbestos fibers in a rubber binder plus a very low content of zinc or brass particles, sold by Johns-Manville Company of New York, N. Y., under the designation "J–M Style No. 200." In this material, the rubber binder provides the elastomeric properties of the wear pad under braking load, as well as providing the desired softness which avoids the tearing loose of the silicon crystals in the alloy brake drum surface. In both these respects, the wear pad performance is substantially different from that of the usual resin-bound asbestos friction materials which have no significant resilience and are much too hard to be used with a brake drum of hypereutectic aluminum-silicon alloy.

This novel combination of brake drum and wear pad materials is particularly advantageous in an electromagnetic brake of the general type illustrated in the drawing. There, if the brake drum 18 is of steel there is a tendency for the magnetic steel particles which are worn off the braking surface of the drum to collect in the air gap between the ferromagnetic brake shoes 14 and 15 at their pole tips 22, 23. Also, if the wear pads contain particles of magnetizable material, these particles, after being worn off, similarly tend to collect in this air gap. Ultimately such magnetic particles in the air gap prevent the air gap from closing fully when coil 24 is energized. This difficulty is completely avoided by the use of a non-magnetic aluminum alloy brake drum in accordance with the present invention and by the use of wear pads which are free of magnetizable particles. A further advantage is that the lighter weight of the aluminum alloy drum or disc provides a much lower inertia, with a corresponding reduction of the response time of the brake.

While a particular brake embodying the present invention has been shown and described and specific examples have been given of the presently-preferred materials for the wear pads and drum or disc in accordance with the present invention, it is to be understood that the invention is susceptible of other embodiments differing from those specifically disclosed herein.

I claim:

1. A torque-sustaining frictional coupling comprising first and second relatively rotatable structures, said first structure including a frictional-engagement member composed primarily of aluminum with silicon particles embedded therein, said second structure including a friction wear pad in confronting relationship to said frictional-engagement member of the first structure, means for selectively bringing said frictional-engagement member and said wear pad into torque-sustaining frictional engagement with each other at a maximum pressure between them of less than 50 pounds per square inch, and said wear pad being composed of material which is elastomeric under the pressure of said torque-sustaining engagement.

2. A torque-sustaining frictional coupling comprising first and second relatively rotatable structures, said first structure including a frictional-engagement member of hypereutectic aluminum-silicon alloy, said second structure including a friction wear pad in confronting relationship to said frictional-engagement member of the first structure, means for selectively bringing said frictional-engagement member and said wear pad into torque-sustaining frictional engagement with each other at a maximum pressure between them of less than 50 pounds per square inch, and said wear pad being composed of material which is elastomeric under the pressure of said torque-sustaining engagement.

3. A frictional coupling according to claim 2 wherein said wear pad is composed primarily of asbestos in a rubber binder.

4. In a torque-sustaining frictional coupling comprising first and second relatively rotatable structures, said first structure including a frictional-engagement member, said second structure including friction wear pad means in confronting relationship to said frictional-engagement member and movable toward and away from engagement with the latter, spring means urging said wear pad means in one direction, and electromagnetic means energizable to move said wear pad means in the opposite direction against the urging of said spring means, the improvement constituted by said frictional-engagement member being primarily of aluminum with silicon particles embedded therein, and said wear pad means comprising elastomeric material.

5. In a magnetic brake having a brake drum, a pair of oppositely disposed ferromagnetic brake shoes inside said drum, frictional wear pads on said shoes in confronting relationship to said brake drum, said brake shoes presenting confronting pole tips which define an air gap, spring means urging said brake shoes outwardly for torque-sustaining engagement of said wear pads with the brake drum, and coil means inductively coupled to said brake shoes and energizable to draw said brake shoes inwardly to close said air gap and to retract said wear pads away from the brake drum, the improvement which comprises: said wear pads being of elastomeric material, and said brake drum being of hypereutectic aluminum-silicon alloy.

6. A brake according to claim 5 wherein said wear pads are composed primarily of rubber-bound asbestos.

References Cited by the Examiner

UNITED STATES PATENTS

| | | | |
|---|---|---|---|
| 1,746,494 | 2/1930 | Norton | 188—218 |
| 1,843,621 | 2/1932 | Norton | 188—218 X |
| 1,850,563 | 3/1932 | Norton | 188—218 X |
| 1,900,804 | 3/1933 | Crowe | 188—218 |
| 3,016,269 | 1/1962 | DeLorean | 188—218 X |
| 3,285,374 | 11/1966 | Mason | 188—171 |

DUANE A. REGER, *Primary Examiner*.

UNITED STATES PATENT OFFICE

CERTIFICATE OF CORRECTION

Patent No. 3,317,011 May 2, 1967

James A. Mason

It is certified that error appears in the above identified patent and that said Letters Patent are hereby corrected as shown below:

Column 2, line 14, "year" should read -- wear --. Column 3, line 74, "sustatining" should read -- sustaining --. Column 4, line 36, "1.9%" should read -- 19.0% --; line 39, "Silicone" should read -- Silicon --.

Signed and sealed this 5th day of August 1969.

(SEAL)
Attest:

Edward M. Fletcher, Jr.
Attesting Officer

WILLIAM E. SCHUYLER, JR.
Commissioner of Patents